Patented Apr. 5, 1949

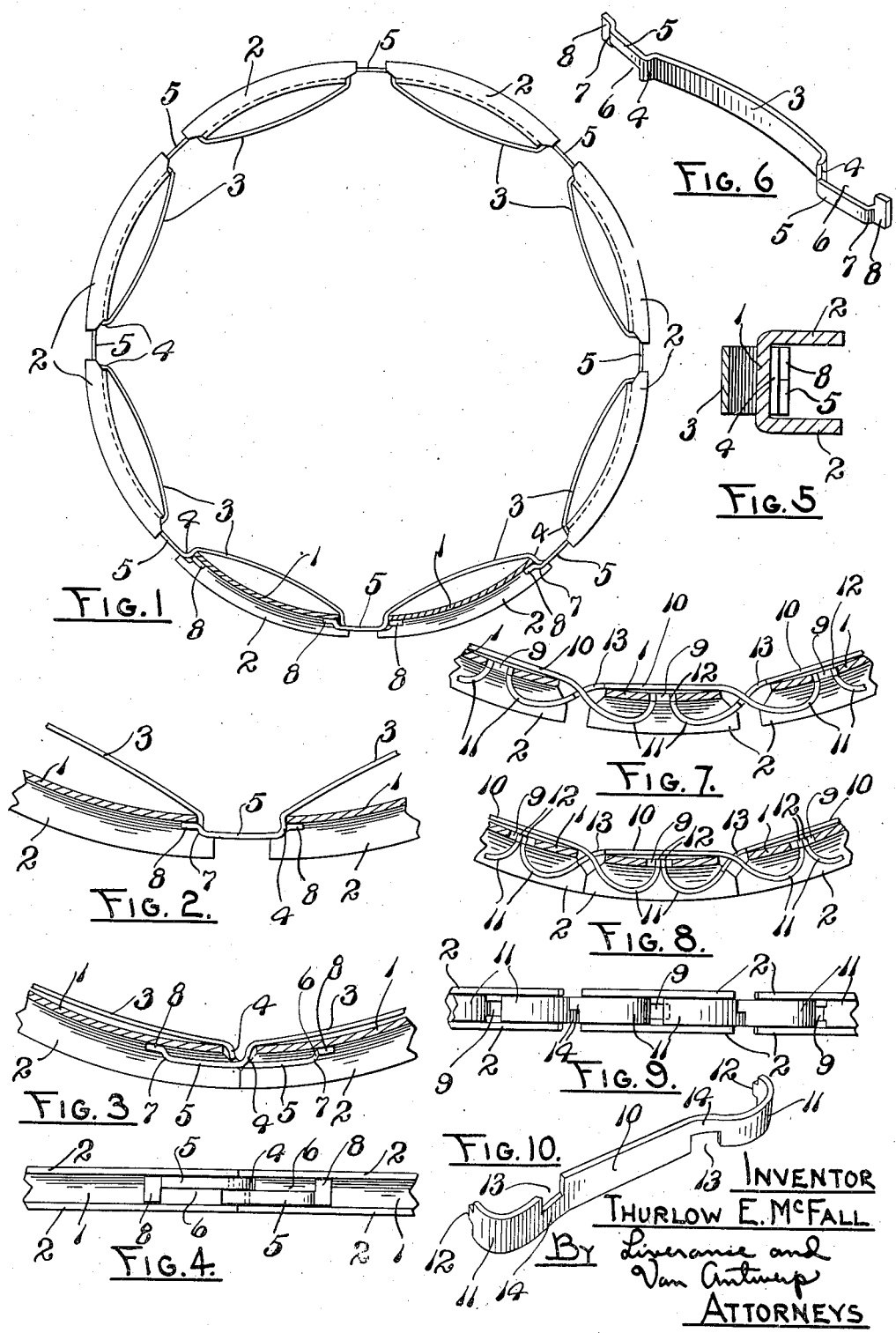

2,466,252

UNITED STATES PATENT OFFICE 2,466,252

PISTON RING

Thurlow E. McFall, Sparta, Mich., assignor to Muskegon Piston Ring Company, Muskegon, Mich., a corporation of Michigan Application April 28, 1947, Serial No. 744,347

6 Claims. (Cl. 309—45)

The present invention is directed to a novel piston ring construction preferably of steel, which is circumferentially contractable within the cylinder of an internal combustion engine, being forced by such contraction into the ring groove of a piston, the outer bearing surfaces of the ring pressing against the cylinder walls with a substantially uniform pressure.

With my invention the bearing members which provide such bearing surfaces are separate from the means used to provide the yielding spring force which presses them radially outward against said cylinder walls. They are located in succession around the circumference of the piston ring and are spaced at their ends when not in use or service, but are moved toward each other to close substantially at their ends when installed within an engine cylinder. The necessary thickness or gauge of steel to provide the requisite area of bearing surface for the piston ring may be used, without reference to the strength of the material from which the spring means is made, being wholly separate therefrom and may be of a different type of steel or other spring material. Furthermore, the spring means used is selected solely for the spring force function which it is to perform, and there is no inescapable connection of one with the other, so that the force of the spring parts of the ring may be decreased or increased in order to obtain a lesser or greater tension, or one that is workable, whereas in those rings in which the metal for the bearing members and the spring is integral, the bearing area to work against the cylinder walls is in general so small that excessive wear greatly reduces the effective life of the ring.

With my invention, with the outer ring segments which press against the cylinder wall, there is inter-connected a plurality of spring members, one back of each of the outer ring segments and at each end extending to and having a cooperative relation with the end portions of the next adjacent segments. Therefore, the spring members overlap between the adjacent ends of the outer bearing segments and are capable of relative movement with respect to each other in the opening and closing of the ring, accompanying which is a stressing and tensioning of said ring members, each independently of the other, in an accommodation to the adjacent cylinder wall surface, which provides a far greater uniformity of ring tension around the entire periphery of the ring than has heretofore been produced.

An understanding of the invention may be had from the following description, taken in connection with the accompanying drawing, in which Fig. 1 is a plan view, partly in section of the assembled ring of my invention, Fig. 2 is a fragmentary enlarged horizontal section through two of the adjacent ring segments, with the segments separated at their ends, Fig. 3 is a similar view when the ring is contracted to bring ends of the ring bearing segments into substantial contact engagement, Fig. 4 is an elevation of the structure in Fig. 3, Fig. 5 is an enlarged transverse section through one side of the assembled ring, Fig. 6 is a perspective view of the spring members, one of which is associated with each of the ring bearing segments, Fig. 7 is a view similar to Fig. 2, showing a different form or embodiment of the invention with the bearing segments separated at their ends, Fig. 8 is a view similar to Fig. 7, with the ring contracted for the bearing segments to closely approach the adjacent ends, Fig. 9 is a fragmentary elevation of the ring in the position indicated in Fig. 7, and Fig. 10 is a perspective view of the modified spring member, one used with each of the separating segments.

Like reference characters refer to like parts in the different views of the drawing.

In the form of the invention shown in Figs. 1 to 6 inclusive, the ring is made up of a plurality of ring segments each preferably an equal fractional part of a circle. Such segments are made from flat metal in channel form, each having a vertical web 1 and outwardly extending spaced upper and lower flanges 2, the outer edges of which are of a curved form to fit against the inner wall of a cylinder for which the ring is designed. When the several segments are all brought together in substantially end to end contact relationship, the ends of the flanges at their outer portions (Fig. 3) are in close relation to each other. The webs are somewhat shorter at each end than the flanges and their ends are spaced from each other at all times.

With each of the segments a spring member of flat material is used. Said spring member, as in Fig. 6, has an intermediate part 3 of substantially the length of the web 1, at each end being bent outwardly for a short distance as at 4. From the ends of the short bent portions 4, parts 5 extend in opposite directions from each other and each is one-half the width of the width of the portion 3, as shown at 5, edge portions of the material being cut away to leave an elongated slot 6. As shown in Fig. 6, one of said parts 5 has its upper edge flush with the upper edge of the portion 3 and the other has its lower edge flush with the lower edge thereof. The parts 5 at their outer ends are reversely bent to the bends at 4, as at 7, and terminate in a foot 8 of a short length, having the same width as the width of the intermediate portion 3.

One of these spring members is assembled with each of the first described ring sections. The intermediate portions 3 are inside of the web 1 and the bent portions 4, extending outwardly, engage against the ends of the webs 1. The oppositely extending parts 5 bridge the gap between the ring segment to which the spring member is applied and the next adjacent ring segments and the opposite feet 8 bear against the outer sides of the webs 1 of the two next adjacent ring segments. Such assembly using one of the spring members with each of the ring segments, completes the ring with the narrowed portions 5 at gaps between the ends of successive ring sections passing one over the other.

When thus assembled and connected together, the completed ring, as in Fig. 1, will have adjacent ends of the several ring segments spaced a short distance apart. The stops provided by the foot members 8 serve to interlock the several ring segments and prevent their separation and also a disconnection of the several spring members. The ring, in its fully expanded position, has a greater inside diameter than the outside diameter of the piston it is to serve and may be slipped over the piston and contract partially into the piston ring groove without developing any outward pressure. But from that stage, further contraction will operate to create the outward pressure with which the ring bears against the cylinder walls. When the ring is further compressed and contracted to a smaller diameter within an engine cylinder for which it is designed, the ends of the webs 2 of adjacent segments are brought substantially together and the overlapping parts 5 are slid longitudinally with respect to the webs 1, as in Fig. 3, the adjacent bends 4 at the end portions of two spring members being received in the space left between the adjacent ends of webs 1 of two consecutive ring segments and in such portions of the webs 2 as are removed.

The intermediate portions 3 of the spring members are stressed, increasing the tension therein, and in normal practice bear against the bottoms of the ring grooves of the pistons in which mounted. This provides an outward thrust of the ring segments which bear against the cylinder wall, and the thrust of each ring segment is in large measure that which is provided by the spring member associated with it. Irregularities or departures from true circular cross-section of the inner bearing surface of a cylinder wall are more perfectly taken care of each by the ring section directly within it and the ring conforms more closely to the inner wall surface of a cylinder than when it is made of a single length of cast iron or other metal. Oil which may be scraped from the cylinder walls and collected in the groove between the flanges 2 of the channel ring sections may escape at the openings between the ends of the webs; and of course, vent openings, if desired, may be made through the webs 1 or spring 3 at a desired place in each, or at more than one place therein.

In Figs. 7 to 10 inclusive, a different form and embodiment of the invention is shown. The ring sections having webs 1 and flanges 2 are of shorter length and more of them are required for a completed ring. Each of the webs is provided substantially midway between its ends with a narrow somewhat elongated slot 9.

The springs (Fig. 10) each have an intermediate portion 10 and are continued in curved parts 11, which are bent away from the plane of the central portion 10 and then return bent as shown. At each end of the curved parts 11, a short tongue 12 is provided, the width of which is slightly less than the width of the openings 9. At the juncture of the central portion 10 and the curved parts 11, rectangular recesses 13 are made by cutting away a portion of the material at opposite longitudinal edges of the spring member, thereby leaving upper and lower connecting sections 14, each substantially one-half of the width of the intermediate portion 10, one at one side of the spring member and the other at the other side thereof.

One of such spring members is used with each of the ring segments. The intermediate or central portion 10 is at the inner side of each of the webs 1, and the end curved portions 11 extend outwardly and at their return bent ends have the tongues 12 received in the openings 9 of the two next adjacent segments. The parts 14 of consecutive ring members cross each other at the spaces between the ends of adjacent ring segments (Fig. 7).

On compressing and contracting the ring from the position in Fig. 7 to that in Fig. 8, said spring members are stressed and an outwardly acting radial force on each of the ring segments is provided for attaining the desired pressure against the cylinder walls. It is apparent that the length of the ring segments is provided for attaining the desired pressure against the cylinder walls. It is apparent that the length of the slots 9 permits relative movement of the tongues 12 therein in the contraction and expansion of the piston ring thus made; and that when assembled all of the parts are held together against normal disconnection.

With the structures described, the thickness or gauge of metal used for the several ring segments is independent of the thickness of the spring metal used in the spring members. Therefore, the necessary bearing area against cylinder walls to prevent over or excessive wear is controlled without reference to the unit pressure of the bearing surfaces of the ring against the wall, as the gauge of metal of the spring members may similarly be increased or decreased, as may be needed, to get the desired cylinder wall unit pressure without reference to the thickness dimension of the flanges of the ring sections which bear against the cylinder walls.

The construction described is practical and useful and in test has proved very satisfactory.

The invention is defined in the appended claims and is to be considered comprehensive of all forms of structure coming within their scope.

I claim:

1. In a piston ring, a plurality of ring segments disposed in end to end relation to each other to complete a circle, substantially, of said segments, a spring member at the inner side and lengthwise of each segment adapted to bear at an intermediate portion against the bottom of a piston ring groove in which the piston ring is located, and at each end extending between its associated ring segment, and the segments next adjacent the ends thereof and bearing at its ends against the outer sides of the end portions of said next adjacent segments, the spring members of any two successive segments crossing each other between the adjacent ends of said segments.

2. The elements of claim 1 in which said spring members also bear against the inner sides of their adjacent segments near the ends thereof.

3. In a piston ring, a plurality of arc-shaped ring segments each of channel form, having a vertical web and upper and lower outwardly extending spaced horizontal flanges, an elongated spring member located at the inner side of each of said segments lengthwise thereof, having end portions extending beyond the ends of associated segments and to and in front of the webs of the next adjacent ring segments, the end portions of the spring members of successive segments crossing each other between the ends of the segments, each of the end portions of each spring member being recessed one at its upper edge and the other at its lower edge at such crossings, and means for preventing the separation of adjacent sections beyond a predetermined distance and permitting relative movement of the segments to bring the ends of the segments into substantially contact engagement.

4. In a piston ring, a plurality of arc-shaped ring segments of channel cross-section, each having a vertical web and upper and lower outwardly extending horizontal flanges, an elongated spring member at the inner side of each segment extending the length of the web thereof and at the ends of said web extending outwardly a short distance and thence substantially in the same direction, said last mentioned portion of the spring member being narrowed in width for its length substantially one-half of said width and terminating in a foot of short length having the full width of the spring member, the spring members of successive segments crossing each other between the ends of the segments at the narrowed portions thereof.

5. A construction as defined in claim 4, said spring members being longitudinally bowed inwardly and the webs of said segments being shorter at each end than the flanges thereof, and said flanges at their ends having outer portions thereof located in radii of the completed rings and inner portions at an angle thereto.

6. In a piston ring, a plurality of arcuate ring segments located in end to end relation, each of channel form in cross-section, having a vertical web and upper and lower outwardly extending horizontal flanges, each of said webs between its ends having a longitudinal slit therein, an elongated spring member at the inner side of the web of each of said segments extending the length thereof and beyond the ends of the segments having end portions outwardly curved and extending between the flanges of the next adjacent segments and terminating in inwardly extending portions provided with tongues, said tongues entering the slots in the webs of said next adjacent segments.

THURLOW E. McFALL.

REFERENCES CITED

The following references are of record in the file of this patent:

UNITED STATES PATENTS

| Number | Name | Date |
| --- | --- | --- |
| 2,319,098 | Zahodiakin | May 11, 1943 |
| 2,355,772 | Zahodiakin | Aug. 15, 1944 |